Feb. 6, 1951     C. H. NYSTROM     2,540,755
FUEL INJECTION SYSTEM AND APPARATUS
Filed June 25, 1947     7 Sheets-Sheet 1

INVENTOR.
CARL H. NYSTROM
BY
Raymond A. Paquin
ATTORNEY.

Feb. 6, 1951 C. H. NYSTROM 2,540,755
FUEL INJECTION SYSTEM AND APPARATUS
Filed June 25, 1947 7 Sheets-Sheet 3

INVENTOR.
CARL H. NYSTROM
BY
Raymond A. Paquin
ATTORNEY.

Feb. 6, 1951     C. H. NYSTROM     2,540,755
FUEL INJECTION SYSTEM AND APPARATUS
Filed June 25, 1947     7 Sheets-Sheet 4

INVENTOR.
CARL H. NYSTROM
BY Raymond A. Paquin
ATTORNEY.

Feb. 6, 1951     C. H. NYSTROM     2,540,755
FUEL INJECTION SYSTEM AND APPARATUS
Filed June 25, 1947     7 Sheets-Sheet 5

INVENTOR.
CARL H. NYSTROM
BY
Raymond A. Paquin
ATTORNEY.

Feb. 6, 1951  C. H. NYSTROM  2,540,755
FUEL INJECTION SYSTEM AND APPARATUS
Filed June 25, 1947  7 Sheets-Sheet 6

INVENTOR.
CARL H. NYSTROM
BY
Raymond A. Paquin
ATTORNEY

Feb. 6, 1951

C. H. NYSTROM 2,540,755

FUEL INJECTION SYSTEM AND APPARATUS

Filed June 25, 1947

INVENTOR.
CARL H. NYSTROM
BY
Raymond A. Paquin
ATTORNEY.

Patented Feb. 6, 1951

2,540,755

UNITED STATES PATENT OFFICE 2,540,755

FUEL INJECTION SYSTEM AND APPARATUS

Carl H. Nystrom, West Springfield, Mass., assignor, by mesne assignments, to United Aircraft Corporation, East Hartford, Conn., a corporation of Connecticut Application June 25, 1947, Serial No. 756,967

5 Claims. (Cl. 103—41)

This invention relates to a fuel injection system and apparatus for combustion engines and more particularly to a new and improved accumulator type fuel injection pump which is relatively small, compact and lightweight and, therefore, particularly adaptable for use with aircraft engines where size and weight are of tremendous importance and which pump is capable of providing injections of very short duration thereby providing more constant volume combustion.

An object of the invention is to provide a fuel injection system and pump of the type set forth which is of unitary construction of relatively few parts and which is relatively small, compact and lightweight and which is capable of providing injections of relatively short duration.

Another object of the invention is to provide a fuel injection pump of the type set forth which is capable of providing a relatively short duration injection, at high pressure, immediately upon lifting of the nozzle valve thus giving faster delivery and providing a more constant volume combustion.

Another object of the invention is to provide new and improved spill means for a fuel injection pump of the type set forth which spills faster and, therefore, aids in the obtaining of faster delivery or injection.

Another object of the invention is to provide a device of the type set forth with new and improved means for preventing the backing up in the fuel line of the high pressure spill and also for dissipating high pressure surges in the fuel line and thereby preventing erosion of the edge of the plunger.

Another object of the invention is to provide a new and improved fuel injection pump of the type set forth which is constructed of relatively few parts, thereby facilitating and making more economical the construction and assembly thereof yet providing a device which is efficient in operation.

Another object of the invention is to provide new and improved means for controlling the timing of a fuel injection pump.

Another object of the invention is to provide new and improved quantity control means for a fuel injection pump.

Other objects and advantages of the invention will be apparent from the following description taken in connection with the accompanying drawings. It will be understood that many changes may be made in the details of construction and arrangement of parts without departing from the invention as expressed in the accompanying claims. I, therefore, do not wish to be limited to the exact details of construction and arrangement of parts shown and described, as the preferred form has been given by way of illustration only.

Referring to the drawings.

Figure 1:
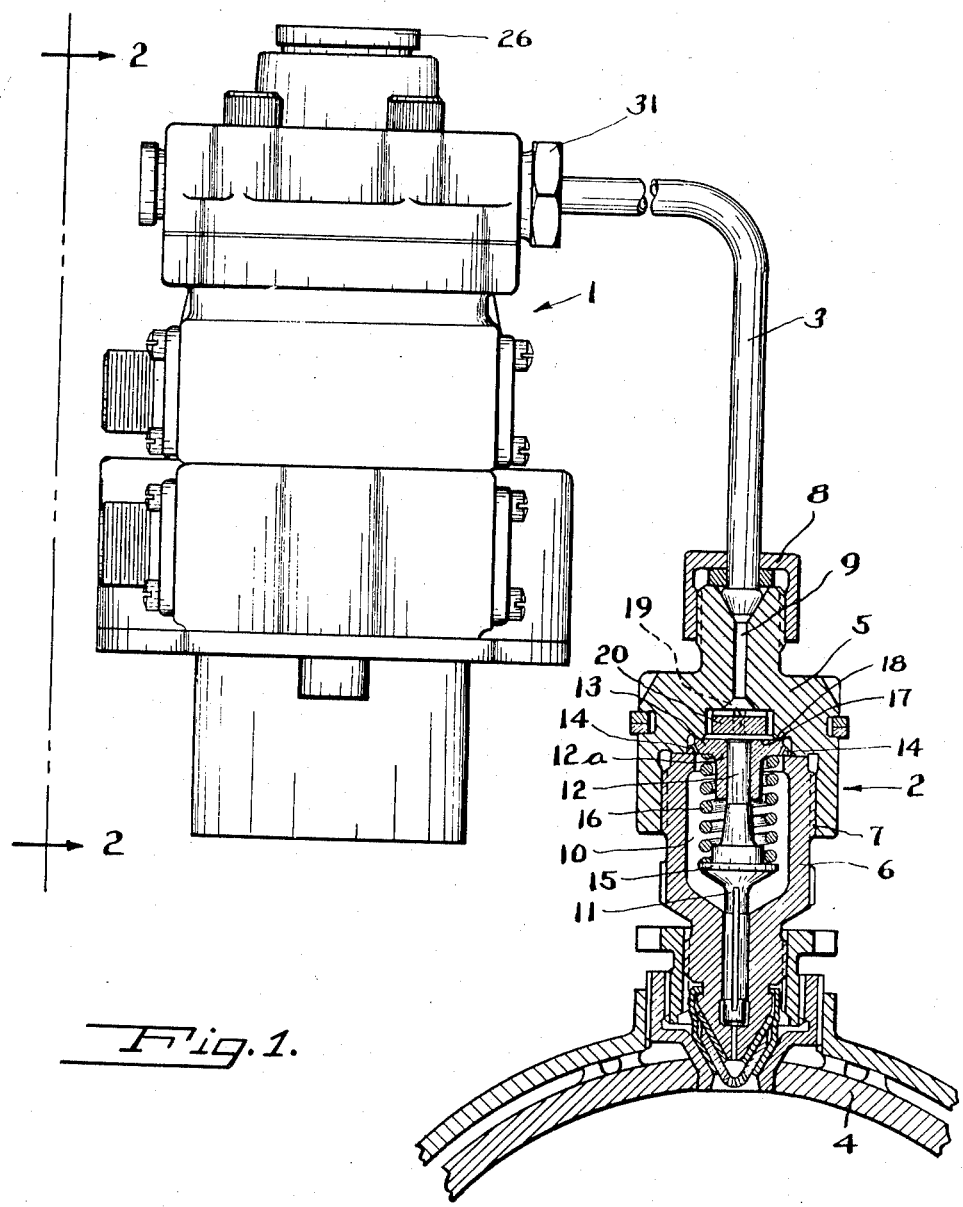
Fig. 1 is an assembly view of the fuel injection system and showing a side view of the fuel injection pump and a sectional view of the nozzle used in conjunction therewith.
Figure 2:
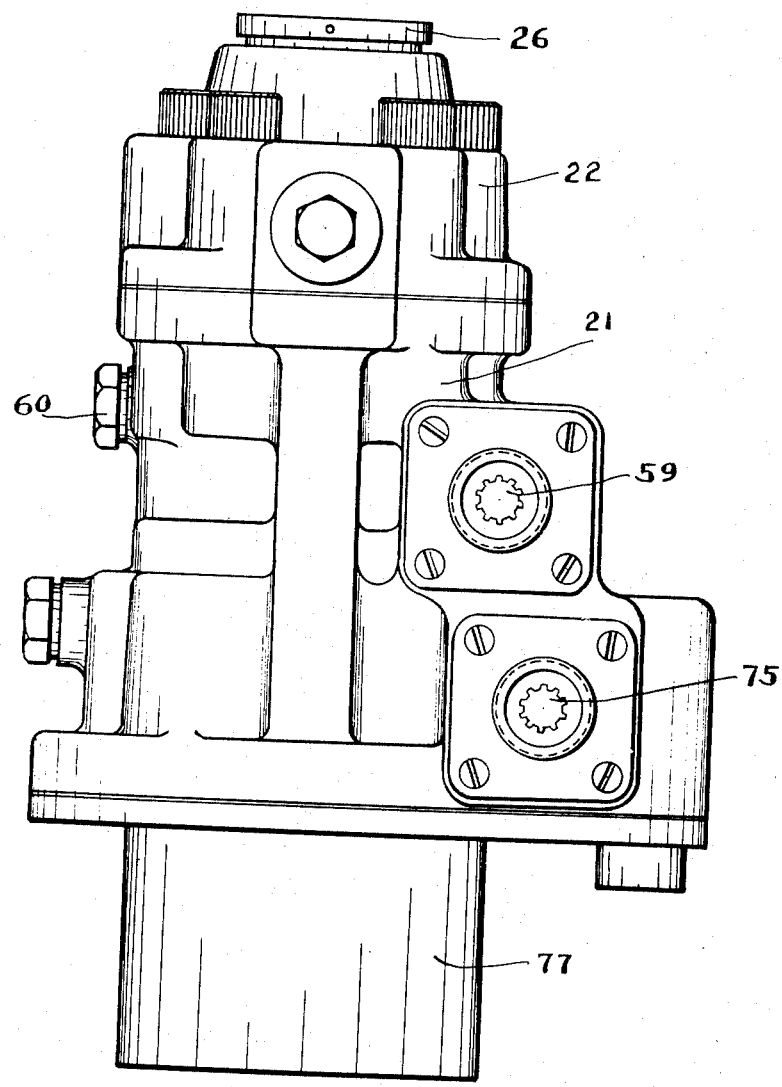
Fig. 2 is a view taken along line 2—2 of Fig. 1, looking in the direction of the arrows.
Figure 3:
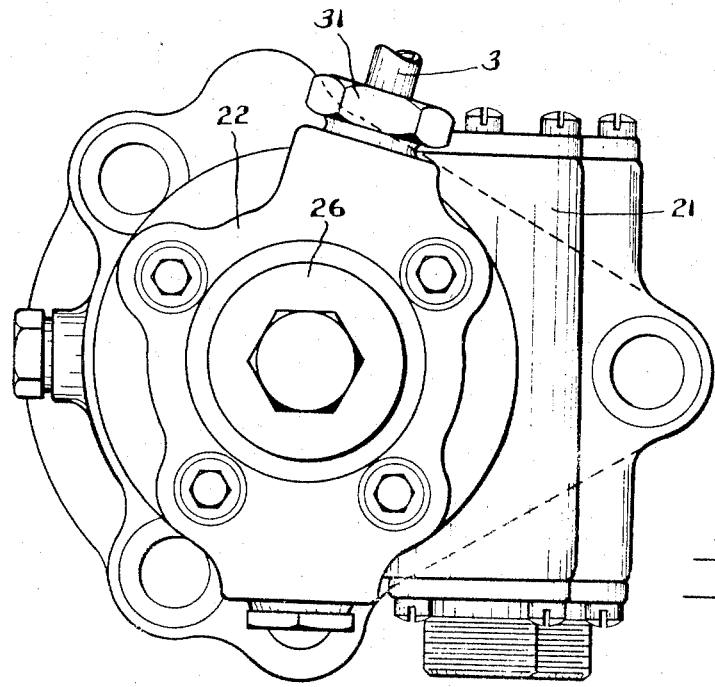
Fig. 3 is a top or plan view of the pump shown in Figs. 1 and 2.
Figure 4:
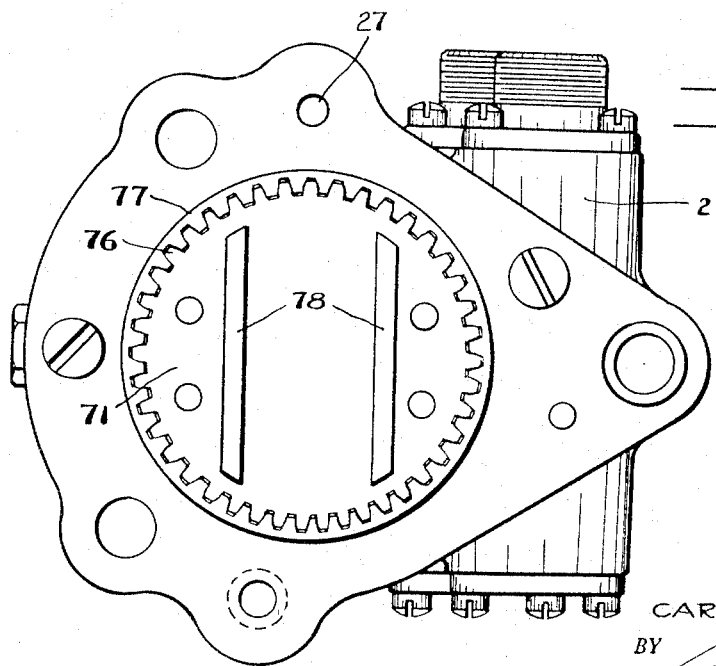
Fig. 4 is a bottom view thereof.

Referring more particularly to the drawings wherein similar reference characters designate corresponding parts throughout the various views, the arrangement shown in Fig. 1, embodying the invention, comprises the fuel injection pump 1 and accumulator type nozzle 2 which are connected by the fuel line 3 to supply fuel from said pump 1 to the nozzle 2 which extends through the wall 4 of a combustion chamber and is adapted to supply fuel thereto.

The fuel line 3 is preferably made as short as practical, as this has been found to facilitate faster delivery and increased volumetric efficiency of the system.

The nozzle 2 shown in Fig. 1, which is adapted for use in the present system, is of the accumulator type and comprises the support 5 and the nozzle body 6, each of which have threaded portions adapted to be engaged at 7 to secure the parts in operative relation.

The support 5 is connected to the fuel line 3 by the coupling 8 and has the central opening 9 through which fuel is supplied from fuel line 3 to the accumulator chamber 10. The nozzle body 6 contains the accumulator chamber 10 and has an opening through which fuel flows from said accumulator chamber 10 through the nozzle tip into the combustion chamber.

Within the accumulator chamber 10 is the needle valve 11 which has the piston portion 12 which has a lapped fit with and is mounted for movement as hereinafter described in a sleeve 12a. The sleeve has an integral cuff 13 which has a series of openings 14 through which fuel enters the accumulator chamber 10. The needle valve 11 is provided with the shoulder 15 which acts as a seat for one end of the spring 16 which has its opposite end engaging the cuff 13.

The upper surface 17 of the cuff 13 and the lower adjacent surface 18 of the nozzle body 5 are lapped fits so that the cuff seats on the surface 18 to prevent fuel entering or escaping from the accumulator chamber 10 through the opening 9 in the member 5, opening 19 in the member 20 and openings 14 in the cuff 13 when said lapped surfaces are in engagement, as shown in Fig. 1.

In the operation of this nozzle, when there is sufficient fuel pressure in fuel line 3, fuel enters the accumulator chamber 10 by passing through the openings 9 and 19, then between the surfaces 17 and 18 which are separated by the pressure of fuel in the line acting on the cuff, and then through the openings 14 into the chamber 10. The needle valve 11 is closed by the force of the spring 16.

When the pressure in the fuel line 3 is relieved such as by spilling of the pump, as hereinafter described, the fuel pressure in the fuel line 3 is relieved, fuel pressure in the accumulator chamber 10 acts on the under side of the cuff to seat it, assisted by spring 16 thereby forcing the lapped surfaces 17 and 18 into engagement and thus shutting off communication between fuel line 9 and chamber 10. At the same time the pressure acting on the underside of the shoulder 15 and the exposed part of the needle valve 13 lifts the valve off its seat. Fuel accumulated under pressure chamber 10 is thus allowed to spray through the nozzle tip into the combustion chamber until the pressure in chamber 10 drops to a point where it is overbalanced by the force of spring 16 which then forces needle valve 11 into closed position. On the next pumping stroke, the fuel pressure in the fuel line separate moves cuff down to the surfaces 17 and 18 thus allowing fuel to enter the chamber 10. This cycle is repeated for every injection.

Figure 5:
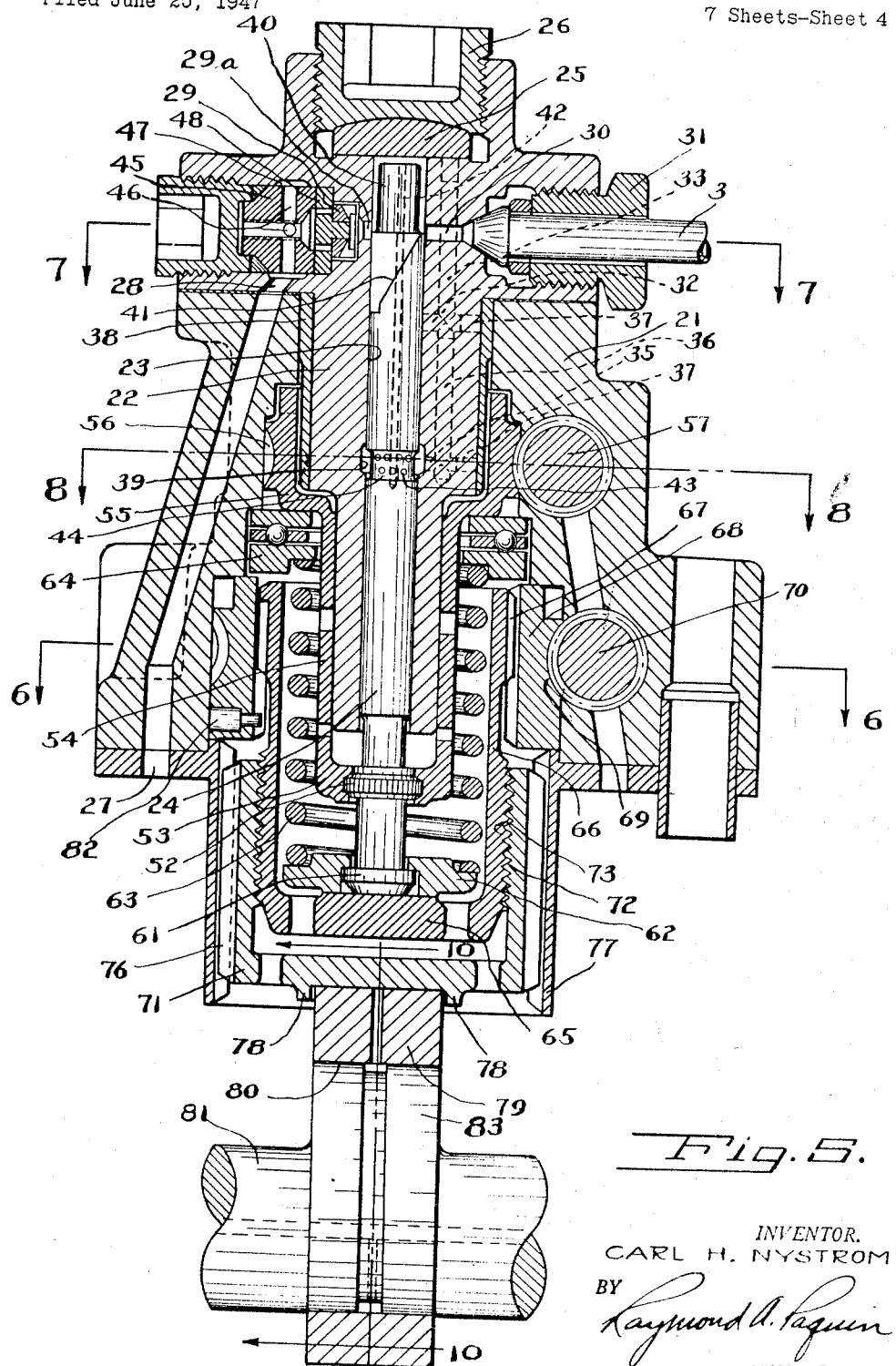
Fig. 5 is a sectional view taken on line 5—5 of Fig. 7, looking in the direction of the arrows.

The fuel injection pump 1 which is adapted to force fuel under pressure into the nozzle 2, for injection into the combustion chamber, as previously described, comprises the pump housing 21, Fig. 5, receiving the plunger barrel 22 having the central bore 23 in which is reciprocally mounted the plunger 24.

The upper end of the bore 23 is closed by the flat lapped washer 25 with a spherical surface for proper seating being held in position by the threaded plug 26.

The housing 21 has the fuel inlet port 27 adapted to be connected to a fuel line (not shown) from a fuel supply tank, and to supply fuel through said port 27 and through port 28 to check valve 29 and port 29a in the plunger barrel 22, the latter port entering the bore 23.

Figure 7:
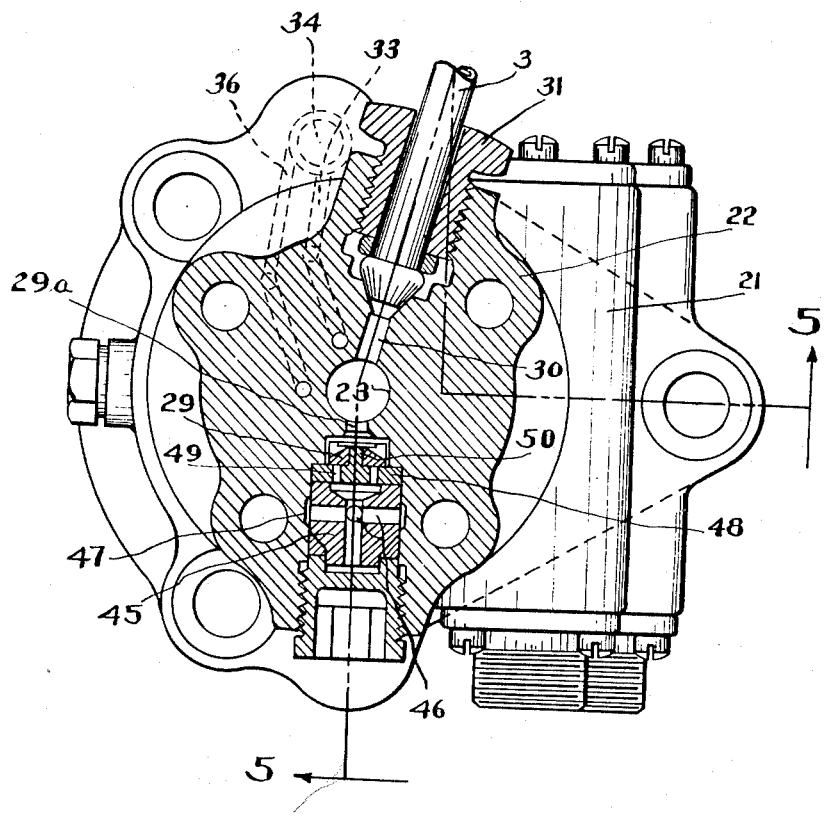
Fig. 7 is a sectional view taken on line 7—7 of Fig. 5, looking in the direction of the arrows.
Figure 9:
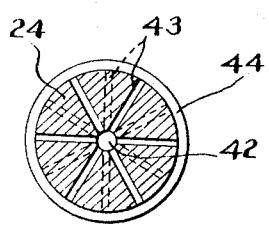
Fig. 9 is a sectional view of the plunger, as shown in Fig. 8, but on an enlarged scale.

The inlet check valve, as shown in Figs. 5 and 7, comprises the valve retainer 45 having the passages 46 communicating with the adjacent annulus 47 in a part of the barrel 22, annulus receiving fuel from the port 28. In engagement with the valve retainer 45 is the valve plate 48 having a ring of small openings 49 therethrough and having the guide stem 50 on which is mounted the check valve 29. This check valve 29 is adapted to be moved by the pressure of fuel through the openings 49 aided by suction created by the plunger 24 in the bore 23 whereby said valve member is lifted slightly away from the holes or openings 49 to allow the passage of fuel therethrough to the port 29a through which it passes to the bore 23. On the upstroke of the plunger 24 fuel is forced through said port 29a against the adjacent surface of the valve 29 causing the same to engage tightly against the surface of plate 48 and prevent the escape of fuel therethrough.

The barrel 22 is also provided with the fuel discharge port 30 to which is connected the fuel line 3, previously described, by the coupling 31. The barrel also has a by-pass port 32 which is connected by passage 33 to the reservoir or receiver 34 and also a high pressure spill port 35 which is connected by a separate passage 36 to said reservoir 34. Both the low pressure spill from bypass port 32 and high pressure spill from port 35 are brought into the receiver or reservoir 34 by separate passages to prevent the high pressure spill from backing up in the low pressure line and thus dissipating the high pressure surges and preventing erosion of the edge of the plunger by such backing up of the high pressure spill. The receiver or reservoir is connected to the fuel supply line and adapted to return the spilled fuel thereto.

The barrel 22 is also provided with a spill annulus or groove 39 adjacent the bore 23 and communicating with the high pressure spill port 35. This groove 39 may extend completely around the bore 23 or any desired part thereof for increasing the speed of spilling of the pump as hereinafter described.

Figure 8:
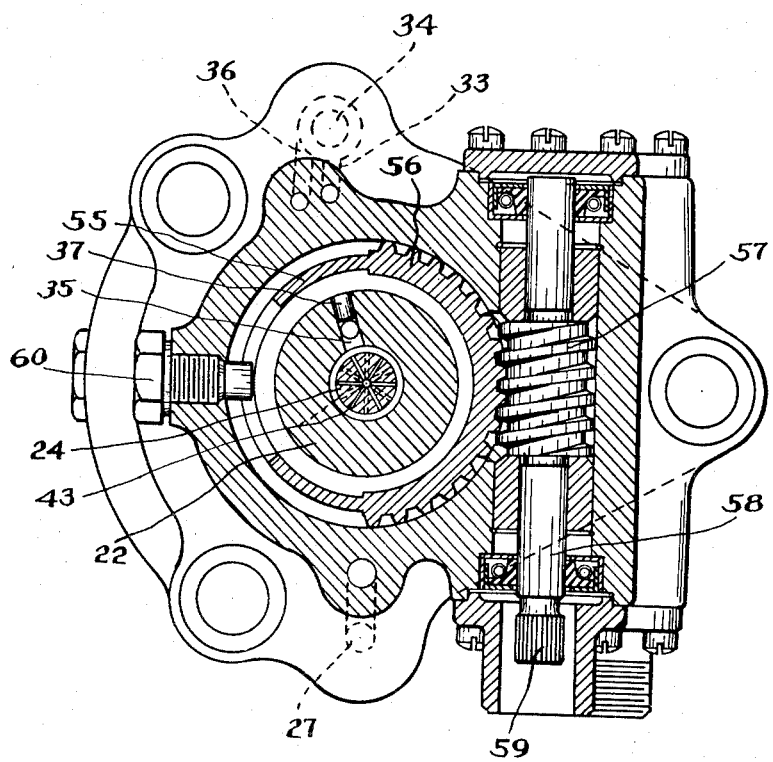
Fig. 8 is a sectional view taken on line 8—8 of Fig. 5, looking in the direction of the arrows.
Figure 10:
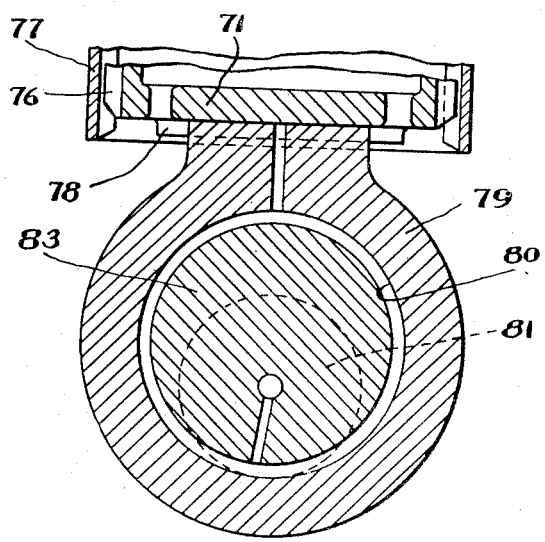
Fig. 10 is a sectional view taken on line 10—10 of Fig. 5, looking in the direction of the arrows.

The ports 32 and 35 are preferably formed by drilling through the wall of the barrel 22 and inserting tight plugs 37, Fig. 8, in said holes adjacent the outer ends thereof outwardly of the passages 33 and 36 and then placing a sleeve 38 in position surrounding the barrel 22 and overlying said plugs to retain the plugs in the holes.

The plunger 24, which is reciprocally mounted in the bore 23 in the barrel 22, is preferably of relatively small diameter and adapted for high speed, high pressure operation, which allows the obtaining of desired output from a compact, lightweight pump. The plunger has a relief portion 40 of reduced cross section adjacent its upper end and is also provided with the usual helix 41 which cooperates with discharge port 32 for controlling the delivery of the pump by turning the plunger.

The plunger is also provided with a central bore 42 which extends from the upper end of plunger to the two axially spaced sets of small radial holes 43 which connect the bore 42 adjacent its lower end with an annular groove 44 on the plunger 24 into which the holes 43 extend. The annular groove 44 is adapted to register with the groove or annulus 39 in the barrel 22 for communicating the pressure at the top of the plunger to the spill annulus 39 for facilitating the spilling of the pump as hereinafter described.

The plunger 24 is provided adjacent its lower end with the knurled portion 52 which is engaged by the flange 53 on the sleeve 54 whereby turning of the sleeve 54 causes simultaneous turning of the plunger 24 in the same direction and to the same extent for controlling the capacity or quantity of fuel delivered by the pump by the angular positioning of the helix 41.

In order to turn said sleeve 54, the upper end of the sleeve is slotted to receive downwardly extending fingers 55' on a ring 55 which overlies the lower portion of sleeve 38, previously described, and which is provided with the worm gear 56. This gear meshes with worm 57 a shaft 58 which has the drive 59, Fig. 8, adapted for connection to a suitable control. A set screw 60 or other suitable stop means engaging in a slot in extension 55 is provided to limit the degree of turning of the sleeve 54 and plunger 24. The interengaging slots and fingers provided for relative axial movement between the sleeve and ring as the plunger reciprocates.

The lower end of the plunger 24 is provided with the shoulder 61 adapted to support the spring seat 62 on which is positioned the coil spring 63. The upper end of the spring engages the lower side of the thrust bearing 64.

The shoulder 61 on the plunger 24 rests on the bottom 65 of the cup-shaped member 66 which has the splined portion 67 adjacent the rim engaging with a corresponding splined portion on the ring 68. An external worm gear 69 on ring 68 meshes with worm 70 whereby the cup-shaped member 66 may be rotated to raise or lower the tappet 71 with respect to the cup through the adjusting of the threaded portion 72 on the tappet 71 relative to the threaded portion 73 on the cup-shaped member 66 when the cup 66 is turned by turning worm 70, it changes the position of the cup 66 and thereby the position of the plunger relative to tappet 71 thereby to change the position at which the pump spills, for tripping the nozzle and causing the injection.

Figure 6:
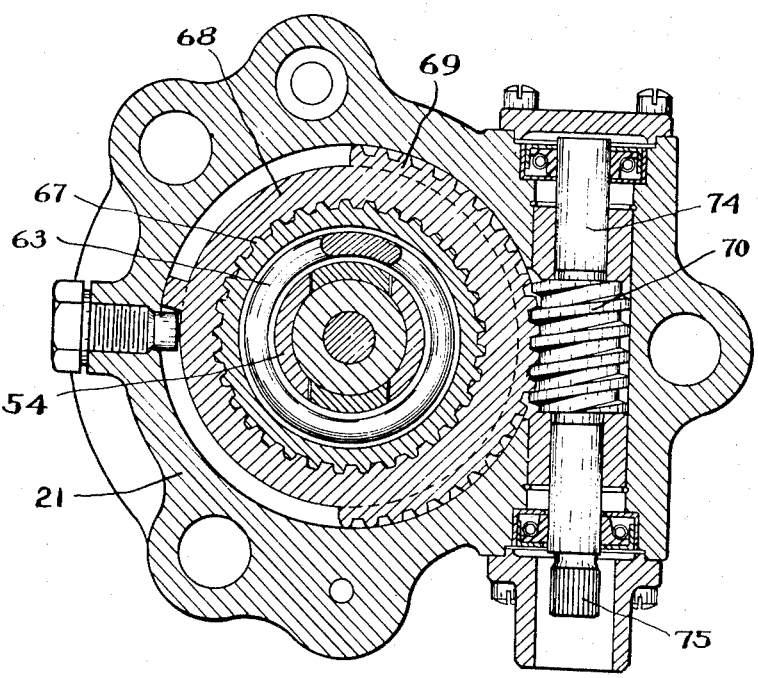
Fig. 6 is a sectional view taken on line 6—6 of Fig. 5, looking in the direction of the arrows.

The worm 70 is on a shaft 74 and has the drive 75, Fig. 6, adapted for connection to a control in a manner described in connection with the quantity control described above.

The tappet 71 is connected by a spline 76 to the extension 77 on the housing 21 to prevent the tappet from turning. The extension 77 also serves to hold ring 68 in position in the housing.

The tappet 71 is provided with the guides 78 between which is positioned the bearing member 79 having the bearing surface 80 in which rotates the eccentric 83 on the main drive shaft 81, the rotation of which is adapted to actuate the bearing member 79 which, in turn, moves the tappet 71 and therethrough the plunger 24. The pin 82 is provided for holding the assembly together while the pump is being assembled and is being installed on the engine.

In the operation of the pump the suction stroke of the plunger 24 serves to draw fuel into the bore 23 during the full downward stroke of the plunger 24 due to the fact that the check valve 29 is always in communication with the bore 23 because of the relief 40 on the upper end of the plunger 24 which allows the inlet port 29 to be uncovered at all times. This insures filling of the bore 23 during the full suction stroke of the plunger.

When the plunger is on its upward or pumping stroke, fuel is discharged through the fuel line 3 to the nozzle until the annulus 44 on the plunger, which communicates with the fuel under pressure in the bore 23 through the bore 42 in the plunger and the radial openings 43, registers with the annulus 39 adjacent the high pressure spill port 35 at which time there will be a quick spilling of the pump due to the registering of the respective annuli 39 and 44 whereby the spilling takes place around the whole circumference of the plunger the moment the upper edge of the plunger annulus 44 registers with the lower edge of the bore annulus 39. This very rapid spilling drops the pressure in line 3 rapidly and thus provides prompt injection.

This cycle is repeated during each suction and pumping stroke of the plunger.

When it is desired to alter the quantity of fuel delivered by the pump to the nozzle, the worm gear 36 is turned by means of worm 57 thereby to change the angular position of the plunger 24 and alter the relation between helix 41 and delivery port 30 for adjusting the quantity of fuel delivered on each pump stroke.

When it is desired to adjust the timing of the pump, the control 75 is adjusted to turn worm 70 relative to worm gear 69 to raise or lower the support 65 and thereby change the position of the plunger 24 in the bore 23 in the barrel 22 and thereby change the relative position of the annulus 44 to the annulus 39 as previously described.

From the foregoing it will be seen that I have provided simple, efficient and economical means for obtaining all of the objects and advantages of the invention.

Having described my invention, I claim:

1. In a device of the character described, a barrel having a bore, a plunger in said bore, said plunger being adapted for reciprocating movement in said bore whereby it will draw fuel into said bore during its suction stroke and supply fuel under pressure to a nozzle on its pumping stroke, fuel supply port means and fuel discharge port means communicating with said bore adjacent the pumping end of said plunger, an annular fuel spill groove in said bore and port means communicating therewith in said barrel, an annular groove in said plunger adapted to register with said spill groove in said bore and a passageway in said plunger adapted to allow the passage of fuel from the bore to the spill groove to thereby spill the pump.

2. In a device of the character described, a barrel having a bore, a plunger mounted for reciprocal movement in said barrel, a spill port in said barrel and communicating with said bore, a metering or by-pass port in said barrel also communicating with said bore, and a receiver or reservoir separately communicating with each of said metering port and spill port, said receiver being adapted to prevent fuel under high pressure from the spill port from backing up in the fuel line and also to dissipate high pressure surges and thereby prevent erosion on the edge of the plunger due to any backing up of the high pressure spill into the bore through the metering port.

3. In a device of the character described, a barrel having a bore, a plunger mounted for reciprocal movement in said barrel, a fuel supply line for supplying fuel to said bore, a spill port in said barrel communicating with said bore and also with said fuel supply line, a metering or by-pass port in said barrel communicating with said bore and also communicating with said fuel supply line, and a receiver connected to said spill port and said metering port intermediate said bore and said fuel supply line, said receiver being adapted to dissipate any high pressure surges of fuel before such fuel is returned to the fuel supply line.

4. In a device of the character described, a barrel having a bore, a plunger mounted for reciprocal movement in said barrel, a fuel supply line for supplying fuel to said bore, a spill port in said barrel communicating with said bore and also with said fuel supply line, a metering or bypass means in said barrel communicating with said bore and also communicating with said fuel supply line and a receiver connected to said spill port and metering port intermediate said bore and said fuel supply line, said receiver being adapted to dissipate any high pressure surges of fuel before such fuel is returned to the fuel supply line, a spill groove on the plunger adapted to register with the spill port in the barrel to spill the pump and a passageway in the plunger allowing the passage of fuel from the bore to the spill groove on the plunger.

5. In a device of the character described, a casing, a barrel in the casing, a plunger mounted for reciprocation in said barrel, actuating means for said plunger, fuel inlet and fuel discharge port means communicating with the bore adjacent the pumping end of said plunger, spill port means in said barrel communicating with said bore, a passageway in said plunger for allowing the passage of fuel from the bore to the spill port means, means for adjusting the normal position of said plunger axially within said bore to thereby control the timing of injection by the pump, a by-pass port in said barrel communicating with said bore and cooperating with a helix on the plunger to adjust the quantity of fuel delivered and means for adjusting the angular relation between the plunger and barrel to vary such quantity, said first-mentioned adjusting means comprising a sleeve engaging with the end of said plunger and reciprocating therewith, means in fixed relation to said barrel for turning said sleeve about the plunger axis, said sleeve having a threaded outer portion and an adjustable threaded member engaging the threaded outer portion of said sleeve and engaging with said actuating means, said threaded member being reciprocable axially of the plunger, whereby the sleeve and plunger may be pivoted to desired angular relation relative to said barrel.

CARL H. NYSTROM.

REFERENCES CITED

The following references are of record in the file of this patent:

UNITED STATES PATENTS

| Number | Name | Date |
|---|---|---|
| 1,289,716 | Fenchelle | Dec. 31, 1918 |
| 1,966,694 | Vaudet et al. | July 17, 1934 |
| 1,999,330 | L'Orange | Apr. 30, 1935 |
| 2,192,387 | Schlaupitz | Mar. 5, 1940 |
| 2,223,756 | Dillstrom | Dec. 3, 1940 |
| 2,322,356 | Hahn | June 22, 1943 |
| 2,357,870 | Beeh | Sept. 12, 1944 |